(12) United States Patent
Jung (10) Patent No.: US 7,272,383 B2
(45) Date of Patent: Sep. 18, 2007

(54) SYSTEM AND METHOD FOR CONTROLLING A MOBILE TERMINAL USING A DIGITAL SIGNATURE

(75) Inventor: Kyung-im Jung, Seongnam-si (KR)

(73) Assignee: Samsung Electronics Co., Ltd., Gyeonggi-do ( * ) Notice: Subject to any disclaimer, the term of this patent is extended or adjusted under 35 U.S.C. 154(b) by 134 days.

(21) Appl. No.: 10/890,209

(22) Filed: Jul. 14, 2004

(65) Prior Publication Data
US 2005/0037736 A1 Feb. 17, 2005

(30) Foreign Application Priority Data
Aug. 12, 2003 (KR) ............... 10-2003-0055795

(51) Int. Cl.
*H04M 1/66* (2006.01)
(52) U.S. Cl. .............. 455/411; 455/410; 455/418; 455/419; 455/420; 455/466; 455/414.1; 380/247; 380/248; 380/249; 380/250; 380/255; 380/270
(58) Field of Classification Search ........ 455/410, 455/411, 418, 419, 420, 414.1, 527, 528, 455/466; 380/247, 248, 249, 250, 270, 283, 380/255; 713/168, 169, 170, 171, 176, 180
See application file for complete search history.

(56) References Cited

U.S. PATENT DOCUMENTS

| 5,809,413 | A | 9/1998 | Meche et al. | |
|---|---|---|---|---|
| 6,662,023 | B1 * | 12/2003 | Helle | ............... 455/558 |
| 6,693,999 | B2 * | 2/2004 | Ito et al. | ............... 379/102.03 |
| 6,707,915 | B1 * | 3/2004 | Jobst et al. | ............... 380/247 |
| 6,741,851 | B1 * | 5/2004 | Lee et al. | ............... 455/410 |
| 2001/0018329 | A1 * | 8/2001 | Tada et al. | ............... 455/39 |
| 2002/0058497 | A1 * | 5/2002 | Jeong | ............... 455/410 |

(Continued)

FOREIGN PATENT DOCUMENTS

JP     2001-169358 A     6/2001

(Continued)

OTHER PUBLICATIONS

J. Lowry, Location-Independent INfomration Object Security, pp. 54-62.

(Continued)

*Primary Examiner*—Joseph Feild
*Assistant Examiner*—Olumide Ajibade-Akonai
(74) *Attorney, Agent, or Firm*—Sughrue Mion Pllc.

(57) ABSTRACT

A mobile terminal control system using a digital signature. The system including a server for preparing a command message for a relevant mobile terminal according to mobile terminal status information set by a user, adding a digital signature to the prepared command message, and transmitting the resultant message. The system further includes a mobile terminal for authenticating the command message transmitted from the server and performing operations of power-off, log-on and log-off of the mobile terminal according to the authenticated command message. The server prepares a command message according to mobile terminal status information set by a user and transmits the prepared command message to a mobile terminal and the mobile terminal authenticates the transmitted command message. The mobile terminal can be controlled only through the authenticated message.

14 Claims, 4 Drawing Sheets

U.S. PATENT DOCUMENTS

| | | |
|---|---|---|
| 2002/0112047 A1 | 8/2002 | Kushwaha et al. |
| 2002/0186845 A1* | 12/2002 | Dutta et al. ................ 380/247 |
| 2003/0013485 A1 | 1/2003 | Jung |
| 2003/0157947 A1* | 8/2003 | Fiatal et al. ................ 455/466 |
| 2004/0176071 A1* | 9/2004 | Gehrmann et al. ......... 455/411 |
| 2005/0009517 A1* | 1/2005 | Maes ...................... 455/432.1 |
| 2006/0003758 A1* | 1/2006 | Bishop et al. .............. 455/419 |

FOREIGN PATENT DOCUMENTS

| | | |
|---|---|---|
| JP | 2002-78001 A | 3/2002 |
| JP | 2002-118877 A | 4/2002 |
| JP | 2003-047065 A | 2/2003 |
| KR | 2003-0008243 A | 1/2003 |
| KR | 2003-0015941 A | 2/2003 |
| KR | 2003-0031293 A | 4/2003 |
| WO | WO 02/102104 A1 | 12/2001 |
| WO | WO 2004/025921 A2 | 3/2004 |

OTHER PUBLICATIONS

"Explanatory Dictionary on Informatics", Moscow, Finances and Statistics, 1995, cited as L1.

* cited by examiner

Power Off Message

| Power Off | Smart phone ID | Random Number |
|---|---|---|

Signed Power Off Message

| Power Off | Smart phone ID | Random Number | Digital signature(Power Off ‖ Smart phone ID ‖ Random Number) | Server certificate |
|---|---|---|---|---|

Secure Log On Request Message

| Secure Log On Request | Smart phone ID |
|---|---|

Secure Log On Approval Message

| Secure Log On Approval | Smart phone ID | Random Number |
|---|---|---|

Signed Secure Log On Approval Message

| Secure Log On Approval | Smart phone ID | Random Number | Digital signature(Secure Log On Approval‖ Smart phone ID ‖ Random Number) | Server certificate |
|---|---|---|---|---|

Secure Log On Disapproval Message

| Secure Log On Disapproval | Smart phone ID | Random Number |
|---|---|---|

Signed Secure Log On Disapproval Message

| Secure Log On Disapproval | Smart phone ID | Random Number | Digital signature(Secure Log On Disapproval‖ Smart phone ID ‖ Random Number) | Server certificate |
|---|---|---|---|---|

SYSTEM AND METHOD FOR CONTROLLING A MOBILE TERMINAL USING A DIGITAL SIGNATURE

BACKGROUND OF THE INVENTION

This application claims priority from Korean Patent Application No. 10-2003-0055795 filed on Aug. 12, 2003 in the Korean Intellectual Property Office, the disclosure of which is incorporated herein in by reference.

1. Field of Invention

The present invention relates to a system and method for controlling a mobile terminal using a digital signature, and more particularly, to a system and method for controlling a mobile terminal using a digital signature, wherein a server prepares a command message according to mobile terminal status information set by a user and controls the corresponding mobile terminal through the prepared command message.

2. Description of the Related Art

Generally, if a user misplaces his/her mobile terminal, the user can prohibit a third person from using the mobile terminal and prevent information stored in the mobile terminal from being accessed, by transmitting a control signal to the lost mobile terminal to turn off the mobile terminal or to cause the mobile terminal to be in a locked state.

However, in such a conventional method of remotely controlling a mobile terminal, there is a problem in that it is impossible to identify the entity that has requested the control of the mobile terminal, for which it may be undesirably controlled by an unauthorized person.

SUMMARY OF THE INVENTION

The present invention is conceived to solve the aforementioned problem. An object of the invention is to provide a system and method for controlling a mobile terminal using a digital signature, wherein a server prepares a command message according to mobile terminal status information set by a user and the mobile terminal authenticates the prepared command message so that the mobile terminal can be controlled only through the authenticated message.

According to an aspect of the present invention for achieving the object mentioned above, there is provided a server, wherein a command message is prepared for a relevant mobile terminal according to mobile terminal status information set by a user, and transmitted after a digital signature is added to the prepared message. The command message may include an operation command and the digital signature for the mobile terminal, a unique number of the mobile terminal, and a sequence number. The server may comprise a database unit for storing mobile terminal information and the mobile terminal status information set by the user; a first authentication unit for authenticating the mobile terminal; and a first control unit for performing control to prepare the command message according to the mobile terminal status information set by the user and to transmit the prepared command message.

According to another aspect of the present invention, there is provided a mobile terminal, wherein a command message transmitted from a server thereto is authenticated, and operations of, for example, power-off, log-on and log-off, are performed according to the authenticated command message. The command message may include, for example, an operation command for the mobile terminal, a unique number of the mobile terminal, and a digital signature for the authentication. The mobile terminal may comprise a second authentication unit for authenticating the command message transmitted from the server; and a second control unit for requesting the server to send a log-on message thereto and controlling operations of power-off, log-on and log-off of the mobile terminal according to the command message transmitted from the server.

According to a further aspect of the present invention, there is provided a method of controlling a mobile terminal using a digital signature, comprising the steps of receiving a log-on request message from the mobile terminal; and preparing a log-on approval message if the status of the mobile terminal, which has been set by the user, is a log-on approved status, or a log-on disapproval message if the status of the mobile terminal is a log-on disapproved status, and transmitting the prepared message to the mobile terminal. The message may include an operation command for the mobile terminal, a unique number of the mobile terminal, and a digital signature for authentication.

According to a still further aspect of the present invention, there is provided a method of controlling a mobile terminal using a digital signature, comprising the steps of requesting a server to send a log-on message when the mobile terminal is powered on; receiving a command message prepared according to mobile terminal status information set by a user from the server; authenticating the received command message; and after completing the authentication of the command message, causing the mobile terminal to be logged on if the message contains log-on approval, or not to be logged on if the message contains log-on disapproval.

Furthermore, the step of requesting the log-on message may be performed when the mobile terminal is set to be in a secure log-on mode. The setting of the secure log-on mode is performed by the steps of receiving a power-off message prepared by the server according to a power-off request from the user; authenticating the power-off message received from the server; cutting off power supplied to the mobile terminal when the authentication of the command message is completed; and setting the mode of the mobile terminal to the secure log-on mode when the mobile terminal is powered off.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, preferred embodiments of the present invention will be described in detail with reference to the accompanying drawings.

Figure 1:
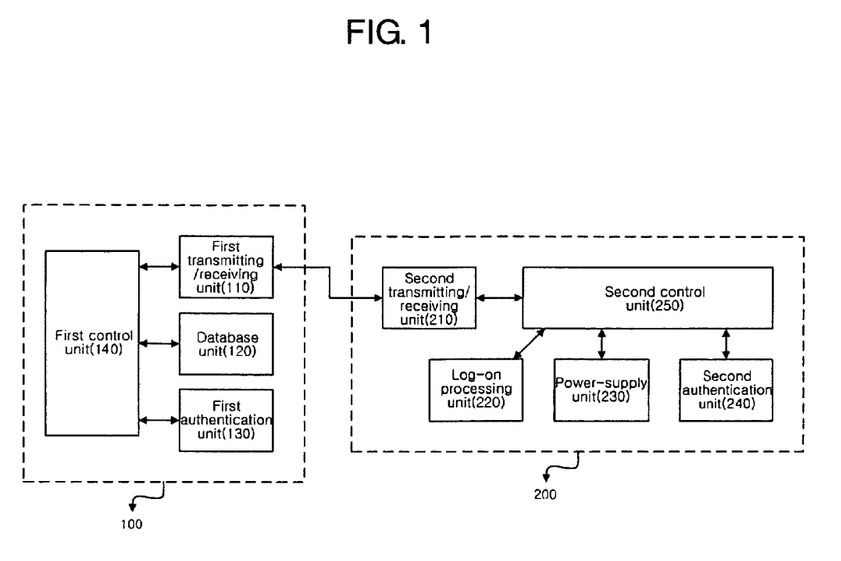
FIG. 1 is a block diagram schematically showing a system for controlling a mobile terminal using a digital signature according to the present invention.

FIG. 1 is a block diagram schematically showing a system for controlling a mobile terminal using a digital signature according to an embodiment of the present invention. The system comprises a server 100 including a first transmitting/receiving unit 110, a database unit 120, a first authentication unit 130 and a first control unit 140. The system further comprises a mobile terminal 200 including a second transmitting/receiving unit 210, a log-on processing unit 220, a power supply unit 230, a second authentication unit 240 and a second control unit 250.

The server 100 prepares a command message for the corresponding mobile terminal 200 according to mobile terminal status information set by a user, adds a digital signature to the prepared command message and transmits the resultant command message to the mobile terminal.

The first transmitting/receiving unit 110 transmits the command message prepared by the first control unit 140 to the mobile terminal 200, and receives a log-on request message sent by the mobile terminal 200. Here, the first transmitting/receiving unit 110 comprises an MMS processing unit for transmitting and receiving messages and an HTTP processing unit for transmitting and receiving information via the wireless Internet.

The database unit 120 stores mobile terminal information and the mobile terminal status information set by the user. Here, the database unit 120 stores a unique number, a serial number, status information and other information of the mobile terminal 200. Meanwhile, the status information represents the current status of the mobile terminal 200. For example, the status information includes information on the setting of the mobile terminal 200 in a power-off state or in a log-on/off state by the user in accordance with whether the mobile terminal 200 has been misplaced.

The first authentication unit 130 processes the authentication for the mobile terminal 200. Here, the first authentication unit 130 provides a digital signature and a certificate for the server to guarantee and confirm the validity of the server 100. That is, the digital signature is a signature for use in proving that the identity of a person who has prepared an electronic document is the true person in question. The digital signature is used for assuring that the original contents of the transferred electronic document have not been altered. With the usage of the digital signature, there are advantages in that a digital document can be easily transferred and protected against being forged by other persons, and a time stamp can be automatically maintained. Here, the digital signature may be understood as a RSA (Rivest-Shamir-Adleman) digital signature, an ECDSA (Elliptic Curve Digital Signature Algorithm) digital signature, or the like. Further, the certificate is used for identifying a user and comprises electronic information representing that a certification authority confirms and certifies a relationship between a digital signature verification key and a natural person or a legal entity who owns the verification key, and the like. The certificate is issued by a private or public certification authority and is generated by signing a user's public key and information on the name and others of an issuer with a signature key of the certification authority.

The first control unit 140 prepares a command message according to the mobile terminal status information set by the user and performs control so that the prepared command message is transmitted to the mobile terminal 200. For example, if the user misplaces the mobile terminal 200, the mobile terminal status information would be set to "power-off." If the user is reunited with the misplaced mobile terminal 200, the mobile terminal status information would be set to "log-on" (log-on approval). Further, the command message is a message for controlling operations of the mobile terminal 200, and includes an operation command, a digital signature and a certificate for the mobile terminal 200, a unique number of the mobile terminal 200, and a sequence number.

The mobile terminal 200 authenticates the command message sent by the server 100, performs power-off and log-on/off operations in accordance with the authenticated command message, and executes a secure log-on mode in the power-off state. When the mobile terminal is in a power-on state, it sends a log-on message to the server 100. Here, the secure log-on mode represents a mode in which the mobile terminal 200 can be logged on only when an authenticated server 100 transmits a log-on approval message thereto. The log-on message represents a message for asking the server 100 whether it approves log-on of the mobile terminal. Further, the mobile terminal may be identified as a smart phone, a cellular phone, a PDA, a pocket PC, or the like.

The second transmitting/receiving unit 210 receives the command message sent by the server 100, and transmits the log-on message of the mobile terminal 200 to the server 100. Here, the second transmitting/receiving unit 210 comprises the MMS processing unit (not shown) for transmitting and receiving messages, and the HTTP processing unit (not shown) for transmitting and receiving information via the wireless Internet.

The log-on processing unit 220 performs the log-on of the mobile terminal 200. For example, when a log-on approval message is transmitted from the server 100 thereto, the log-on processing unit 220 logs on the mobile terminal 200.

The power supply unit 230 performs the power-on/off of the mobile terminal 200. For example, when a power-off message is transmitted from the server 100 thereto, the power supply unit 230 cuts off power supplied to the mobile terminal 200.

The second authentication unit 240 authenticates the message sent by the server 100. The second authentication unit 240 performs the authentication for the server 100 by decrypting the transmitted digital signature through the first authentication unit 130 and verifying the digital signature.

The second control unit 250 requests that the server 100 send a log-on message, and controls the mobile terminal 200 through operations depending on command messages sent by the server. That is, when a command message is transmitted from the server 100, the message is authenticated through the second authentication unit 240. When the authentication has been completed, the second control unit 250 cuts off the power supplied to the mobile terminal 200 by controlling the power supply unit 230, or logs on or off the mobile terminal 200 by controlling the log-on processing unit 220, in accordance with the transmitted command message.

Figure 2:
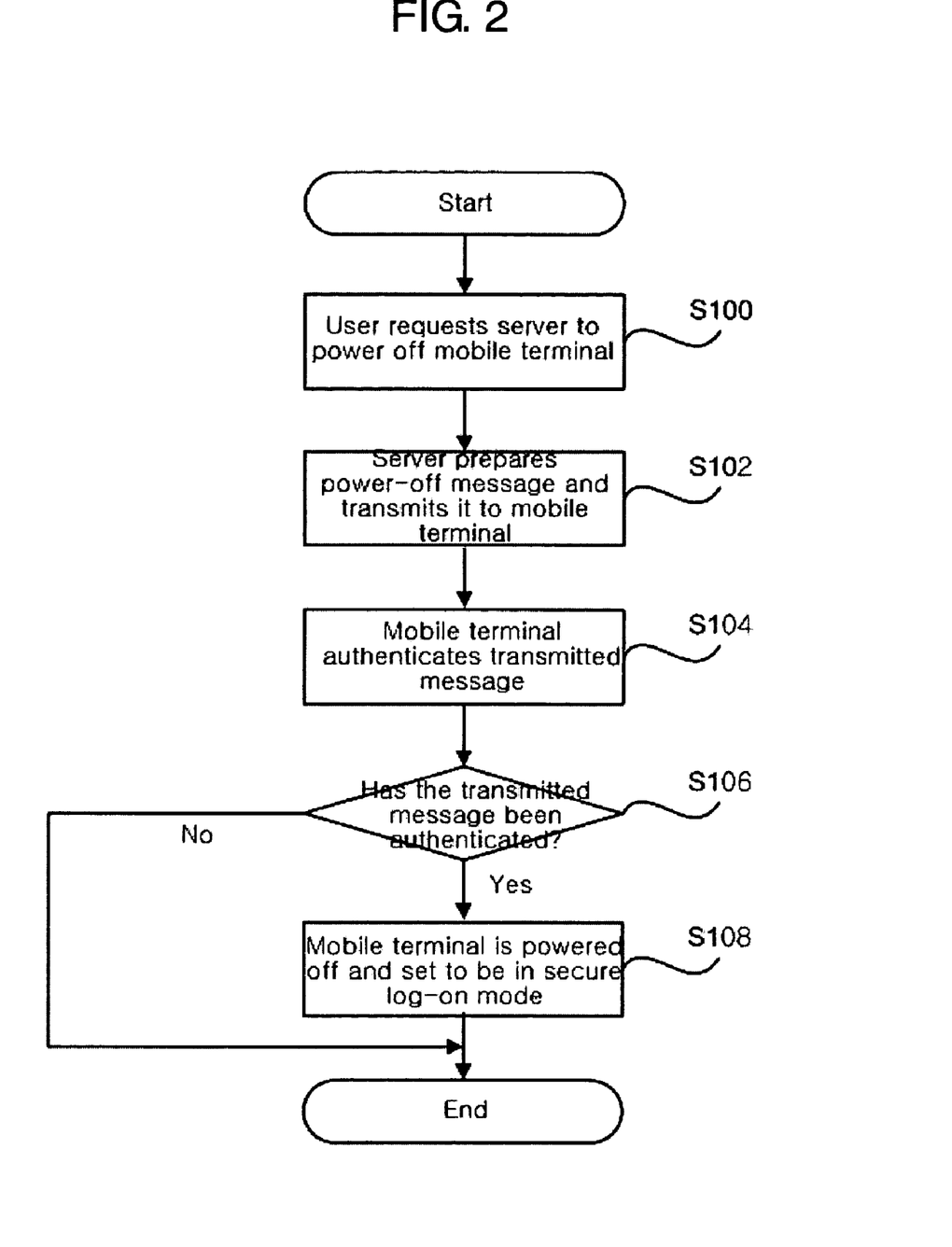
FIG. 2 is a flowchart schematically illustrating the process of cutting off power supplied to a mobile terminal in a method of controlling a mobile terminal using a digital signature according to the present invention.

FIG. 2 is a flowchart schematically illustrating the process of cutting off the power supplied to the mobile terminal in a method of controlling the mobile terminal using the digital signature according to the present invention. First, if the user has misplaced his/her mobile terminal 200, he/she requests the server 100 to cut off the power supplied to his/her mobile terminal (S100).

The server 100 has received the power-off request from the user prepares a power-off message and sends it to the mobile terminal 200 (S102). Here, the power-off message includes a power-off operation command, the digital signature and the certificate for the mobile terminal 200, the unique number thereof, and the sequence number.

Then, when the first control unit 140 of the server 100 prepares the power-off message including the digital signature and the certificate and transmits the message to the mobile terminal 200, the second transmitting/receiving unit 210 receives the message transmitted from the server 100 and transmits it to the second control unit 250.

Accordingly, the second control unit 250 authenticates the transmitted message through the second authentication unit 240 (S104). That is, authentication is performed by decrypting the digital signature and the certificate included in the transmitted message and verifying the decrypted information. Specifically, the unique number of the mobile terminal 200 included in the transmitted message is compared with a number stored in a memory unit (not shown) of the mobile terminal 200. If the compared numbers are identical, the digital signature included in the transmitted message is then verified. Here, the verification of the digital signature is performed based on the certificate stored in the second authentication unit 240.

When the verification during the authentication process is completed (S106), the second authentication unit 240 transmits the verification results to the second control unit 250, and the second control unit 250 cuts off the power supplied to the mobile terminal 200 in accordance with the contents of the transmitted message. At this time, the second control unit 250 performs control such that the mode of the mobile terminal 200 is set to the secure log-on mode and the power-supply unit 230 cuts off the power supplied to the mobile terminal 200 (S108).

When the mobile terminal 200 has been powered off, the second control unit 250 transmits the power-off completion message to the server 100. At this time, if the server 100 does not receive a power-off completion message from the mobile terminal 200 within a predetermined period of time, steps S102 to S108 are repeated. Here, the user or server 100 can arbitrarily set the predetermined period of time and the number of times of the repeat of steps S102 to S108.

Meanwhile, if the server 100 does not receive a power-off completion message from the mobile terminal 200 even after the steps have been repeated as many as the set number of times of the repeat, the server 100 confirms again whether the user intends to perform the power-off of the mobile terminal 200. If the user again requests the power-off of the mobile terminal 200, the server 100 again performs steps S102 to S108.

Figure 3:
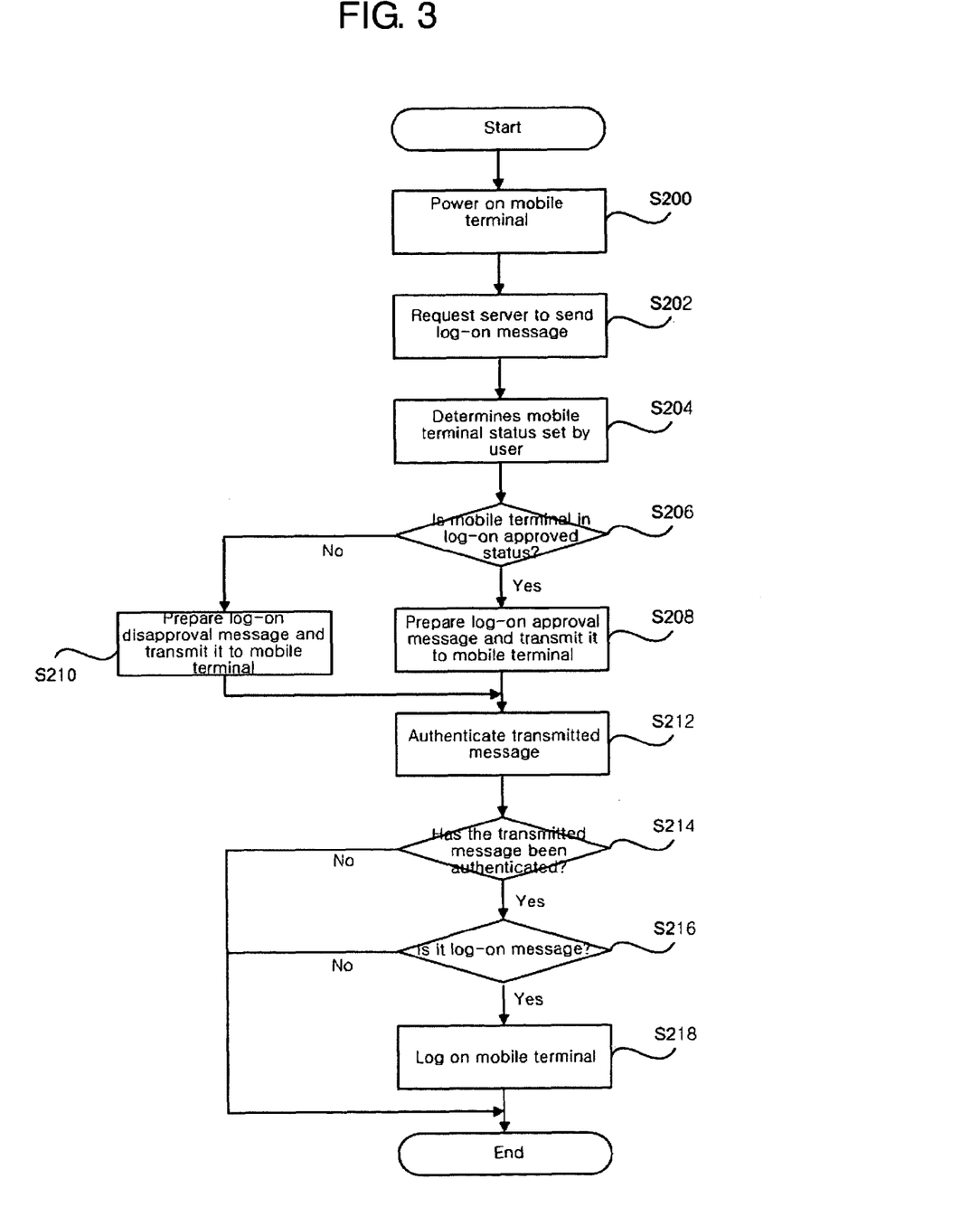
FIG. 3 is a flowchart schematically illustrating the method of controlling the mobile terminal using the digital signature according to the present invention.

FIG. 3 is a flowchart schematically illustrating the method of controlling the mobile terminal using the digital signature according to the present invention. First, when the mobile terminal 200 is supplied with the power (S200), the second control unit 250 transmits a log-on request message to the server 100 to request a message on whether the mobile terminal 200 will be logged on (S202). Here, the second control unit 250 prepares the log-on request message and transmits it to the server 100 via the second transmitting/receiving unit 210. At this time, the message prepared by the second control unit 250 contains a request for the log-on of the mobile terminal 200, and the unique number of the mobile terminal 200.

Meanwhile, it assumed that when the mobile terminal 200 is powered on, the mobile terminal 200 is set to be in the secure log-on mode.

The first transmitting/receiving unit 110 receives the log-on request message transmitted from the mobile terminal 200 and transmits it to the first control unit 140. The first control unit 140 extracts mobile terminal status information set by the user from the database, checks the status of the corresponding mobile terminal 200 (S204), and prepares a command message according to the mobile terminal status information.

That is, if the status of the mobile terminal 200, which has been set by the user, is a log-on approved status, the first control unit 140 prepares a log-on approval message and transmits it to the mobile terminal 200 (S206, S208). If not, the first control unit 140 prepares a log-on disapproval message and transmits it to the mobile terminal 200 (S210). Here, the message sent by the first control unit 140 includes an operation command and the digital signature for the mobile terminal 200, the unique number thereof, and the sequence number. Here, the operation command for the mobile terminal 200 refers to an operation command related to the log-on approval/disapproval. The unique number refers to a peculiar number of the mobile terminal (for example, a telephone number, i.e. 011-xxx-xxxx, in case of a smart phone). The digital signature enables confirmation of the safety and reliability of the server 100 that sends a message. The sequence number is used for determining whether a message sent by the first control unit 140 is transmitted repeatedly. The first control unit 140 arbitrarily sets the sequence number.

Then, when the first control unit 140 of the server 100 prepares the message including the digital signature and the certificate and transmits it to the mobile terminal 200, the second transmitting/receiving unit 210 receives the message transmitted from the server 100 and transmits it to the second control unit 250.

Accordingly, the second control unit 250 authenticates the transmitted message through the second authentication unit 240 (S212). That is, authentication is performed by decrypting the digital signature and the certificate included in the transmitted message and verifying the decrypted information. Specifically, the unique number of the mobile terminal 200 included in the transmitted message is compared with a number stored in the memory unit (not shown) of the mobile terminal 200. If the compared numbers are identical, the digital signature included in the transmitted message is then verified. Here, verification of the digital signature is performed through the certificate stored in the second authentication unit 240.

Thereafter, when the verification during the authentication process is completed (S214), the second authentication unit 240 transmits the verification results to the second control unit 250, and the second control unit 250 operates the mobile terminal 200 in accordance with the operation command corresponding to the contents of the message transmitted from the server 100. If the operation command of the transmitted message is a message approving the log-on of the mobile terminal 200, the process of logging on the mobile terminal 200 is performed (S216, S218). If the operation command of the transmitted message is a message disapproving the log-on of the mobile terminal 200, the process of logging on the mobile terminal 200 is not performed.

Meanwhile, if the mobile terminal 200 logs on in a secure mode, the user can cause the set secure log-on mode to be maintained, or use the mobile terminal after releasing the secure function.

Figure 4:
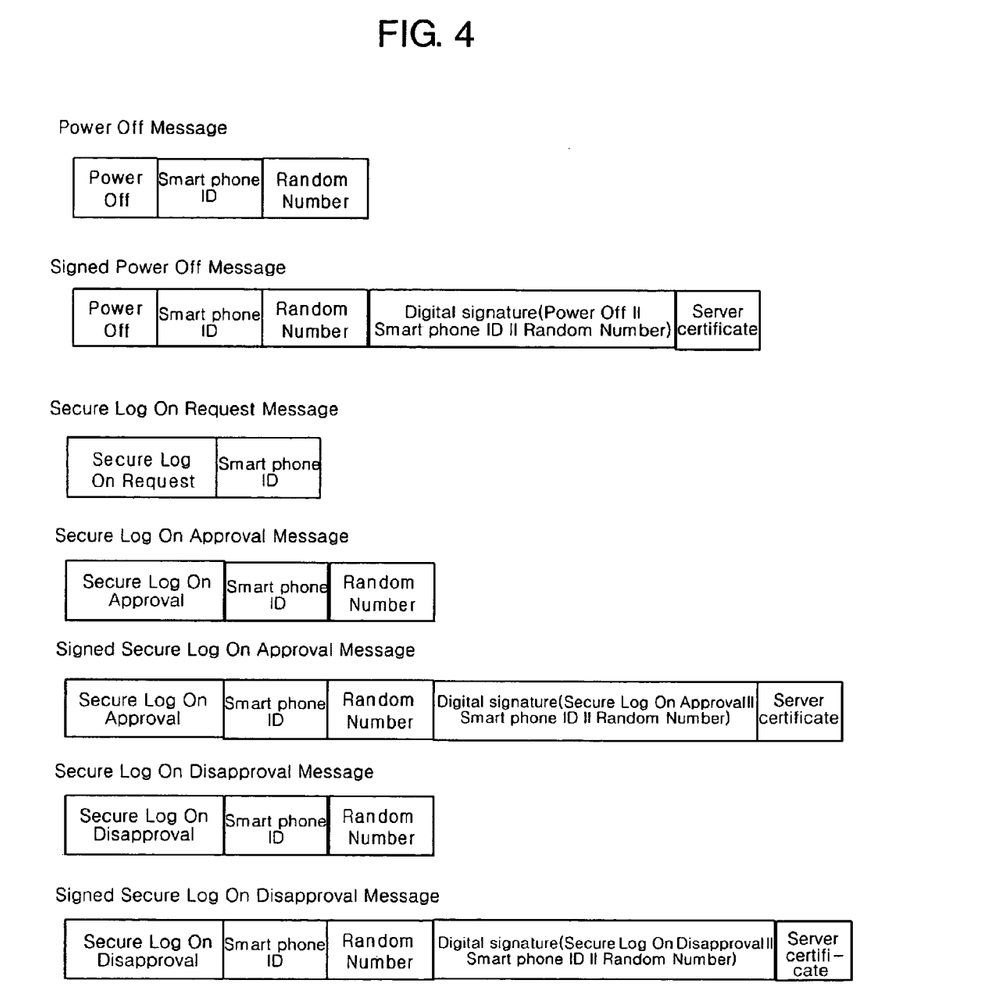
FIG. 4 shows the structures of command messages according to an embodiment of the present invention.

FIG. 4 shows the structures of command messages according to an embodiment of the present invention. Here, the command messages refer to messages for commanding operations related to the power-off and the approval/disapproval of the log-on of the mobile terminal 200.

As shown in the figure, the power-off message includes a message for commanding the power-off, the unique number of the mobile terminal 200 (e.g., ID of a smart phone) and the sequence number (or random number). Upon transmission of the power-off message, the digital signature signed by the server 100 and the certificate for certifying the signature are further included in the power-off message and the resultant power-off message is then transmitted. Here, the unique number of the mobile terminal 200 corresponds to a telephone number in case of a smart phone, and the sequence number is a number randomly set to each message so that the message cannot be used by stealth.

Further, the log-on request message includes a message for requesting the log-on of the mobile terminal 200 and the unique number of the mobile terminal 200.

Furthermore, the log-on approval/disapproval message includes a message for approving/disapproving the log-on of the mobile terminal 200, the unique number of the mobile terminal 200 and the sequence number. Upon transmission of the log-on approval/disapproval message, the digital signature signed by the server 100 and the certificate for certifying the signature are included in the log-on approval/disapproval message and the resultant message is then transmitted.

According to the present invention described above, a server prepares a command message according to mobile terminal status information set by a user and transmits the prepared command message to a mobile terminal and the mobile terminal authenticates the transmitted command message. Thus, there is an advantage in that the mobile terminal can be controlled only through the authenticated message.

Further, if the user requests the mobile terminal to be powered off, the mobile terminal is set to be in the secure log-on mode and then powered off. If a third person who has obtained the mobile terminal intends to log on the mobile terminal, the mobile terminal can be logged on only after performing the authentication thereof through a digital signature. Thus, there is an advantage in that it is possible to limit the use of the mobile terminal by an unauthorized third person even when an encryption or lock function has not been set up in the mobile terminal.

Although the present invention has been described in detail in connection with the embodiments of the present invention, it will be apparent that those skilled in the art can make various modifications and changes thereto within the spirit and scope of the invention defined by the appended claims. Accordingly, simple changes to the embodiments of the present invention are construed as falling within the scope of the invention.

What is claimed is:

1. A server used to control a mobile terminal, wherein a command message is prepared by the server for the mobile terminal according to mobile terminal status information set by a user, in response to the mobile terminal requesting the server to send a log-on message, the command message is transmitted to the mobile terminal after a digital signature is added to the command message by the server, wherein the command message permits the mobile phone to be logged on if the status information set by the user is a log-on approval status, and prevents the mobile phone from being logged on if the status information set by the user is a log-on disapproval status.

2. The server as claimed in claim 1, wherein the command message comprises, an operation command and the digital signature for the mobile terminal, a unique number corresponding to the mobile terminal, and a sequence number.

3. The server as claimed in claim 1, comprising:
a database unit operable to store mobile terminal information and the mobile terminal status information set by the user;
a first authentication unit operable to authenticate the mobile terminal; and
a first control unit operable to prepare the command message according to the mobile terminal status information set by the user and further operable to transmit the prepared command message.

4. A mobile terminal operable to receive a command message transmitted from a server in response to the mobile terminal requesting the server to send a log-on message, wherein the command message is authenticated by the mobile terminal, and operations of the mobile terminal, including power-off, log-on and log-off, are performed according to the authenticated command message.

5. The mobile terminal as claimed in claim 4, wherein the command message comprises an operation command for the mobile terminal, a unique number corresponding to the mobile terminal, and a digital signature for the authentication.

6. The mobile terminal as claimed in claim 4, comprising:
an authentication unit operable to authenticate the command message transmitted from the server; and
a control unit operable to request the server to send a log-on message thereto and control the operations of power-off, log-on and log-off of the mobile terminal according to the command message transmitted from the server.

7. A mobile terminal control system using a digital signature, the mobile terminal comprising:
a server operable to prepare a command message corresponding to a mobile terminal according to mobile terminal status information set by a user, add a digital signature to the prepared command message, and transmit the resultant message in response to the mobile terminal requesting the server to send a log-on message; and
a mobile terminal operable to receive and authenticate the command message transmitted from the server and perform operations including power-off, log-on and log-off in regard to the mobile terminal according to the authenticated command message.

8. A method of controlling a mobile terminal using a digital signature, the method comprising:
setting, by a user, a status of the mobile terminal;
receiving a log-on request message from the mobile terminal;
preparing a log-on approval message if the status of the mobile terminal, is a log-on approved status;
preparing a log-on disapproval message if the status of the mobile terminal is a log-on disapproved status; and
transmitting the prepared message to the mobile terminal.

9. The method as claimed in claim 8, wherein the log-on approval or log-on disapproval message includes an operation command for the mobile terminal, a unique number of the mobile terminal, and a digital signature for authentication.

10. A method of controlling a mobile terminal using a digital signature, the method comprising:
requesting a server to send a log-on message when the mobile terminal is powered on;
receiving a command message prepared in accordance with mobile terminal status information set by a user in the server;

authenticating the received command message; and after completing the authentication of the command message, causing the mobile terminal to be logged on if the command message contains log-on approval, or not to be logged on if the command message contains log-on disapproval.

11. The method as claimed in claim 10, wherein the requesting the log-on message is performed when the mobile terminal is set to be in a secure log-on mode.

12. The method as claimed in claim 11, wherein the setting of the secure log-on mode comprises:

receiving a power-off message prepared by the server in accordance with a power-off request from the user;

authenticating the power-off message received from the server;

cutting off power supplied to the mobile terminal when the authentication of the command message is completed; and setting a mode of the mobile terminal to the secure log-on mode when the mobile terminal is powered off.

13. The method as claimed in claim 12, wherein the cutting off of the power supplied to the mobile terminal when the authentication of the command message is completed further comprises transmitting a power-off completion message to the server when the mobile terminal is powered off.

14. The method as claimed in claim 10, wherein the command message comprises an operation command for the mobile terminal, a unique number of the mobile terminal, and a digital signature for the authentication.

* * * * *